United States Patent [19]
Ravese

[11] 3,897,142
[45] July 29, 1975

[54] MOTION PICTURE PROJECTOR WITH STEP MOTION PROJECTION

[75] Inventor: Frank E. Ravese, Brooklyn, N.Y.

[73] Assignee: DeJur-Amsco Corporation, Long Island City, N.Y.

[22] Filed: June 13, 1974

[21] Appl. No.: 478,897

[52] U.S. Cl. .............. 352/194; 226/62; 352/169; 352/180
[51] Int. Cl.² .......................................... G03B 1/22
[58] Field of Search .......... 352/194, 196, 180, 169; 226/62

[56] References Cited
UNITED STATES PATENTS

| | | | |
|---|---|---|---|
| 2,173,230 | 9/1939 | Kellogg | 352/194 X |
| 3,181,174 | 4/1965 | Griffioen | 352/180 |
| 3,402,007 | 9/1968 | Gerlach | 352/194 X |
| 3,536,389 | 10/1970 | Reinsch | 352/180 |
| 3,580,668 | 5/1971 | Claar | 352/169 X |
| 3,672,755 | 6/1972 | Radl | 352/180 X |
| 3,675,996 | 7/1972 | Wilsch | 352/194 |
| 3,774,828 | 11/1973 | Lach | 352/180 |

Primary Examiner—Monroe H. Hayes

[57] ABSTRACT

An intermittent film transport means for a motion picture projector with step motion projection operable at a normal run film transport cyclic speed, having mechanism for changing the speed of movement of the film driven by said film transport means between (a) a film movement corresponding to said normal run cyclic speed and (b) a film movement which is less than said normal run cyclic speed, said mechanism including cams mounted for rotation about a common axis for producing in-and-out movements of the transport means for film engagement to selectively effect the different speeds, cooperating with a cam follower shiftable for selective engagement with said cams.

13 Claims, 13 Drawing Figures

MOTION PICTURE PROJECTOR WITH STEP MOTION PROJECTION

BACKGROUND OF THE INVENTION

The field of the present invention encompasses mechanism for feeding and handling motion picture film in a motion picture projector wherein a number of different speeds of motion picture projection are producible. The prior art patents relevant to the present invention are Kotler and Ravese U.S. Pat. No. 3,524,573, Procop U.S. Pat. No. 3,481,662 and Lach and Baldwin U.S. Pat. No. 3,774,828. These patents disclose mechanisms for achieving a plurality of different speeds of projector operation. The present invention represents an improvement over the disclosures of these patents by providing for a number of different step speeds of projector operations by an improved structural and operational arrangement of step speed cams and a cam follower structure which is shiftable for selection engagement with such cams.

SUMMARY OF THE INVENTION

The prime object of the invention is the provision of a motion picture projector with step motion projection operable at a normal run film transport cyclic speed, having mechanism for changing the speed of movement of the film driven by said film transport means between (a) a film movement corresponding to said normal run cyclic speed and (b) a film movement which is less than said normal run cyclic speed, said mechanism including cams mounted for rotation about a common axis for producing in-and-out movements of the transport means for film engagement to selectively effect the different speeds, cooperating with a cam follower shiftable for selective engagement with said cams.

A more specific object of the invention resides in the provision of such a step motion picture projector in which the cams comprise a first rotatable in-and-out cam member active on the film transport means for effecting in-and-out movement of the transport means for film engagement for a normal run film transport cycle, a second rotatable in-and-out cam member active on the transport means for effecting an in-and-out movement of the transport means for film engagement at a speed which is less than said normal cyclic speed and an up-and-down cam operable at said normal run cycle speed active on said transport means for effecting up-and-down movements of said transport means, said cam members and cam being mounted for rotation about a common axis, the cam follower being connected to said transport means and being shiftable for selective engagement with said in-and-out cam members.

A further object of the invention resides in the provision of a step motion picture projector as last described in which the in-and-out cam members include cams for effecting the following speeds and modes of projector operation: a normal run cyclic speed (18 FPS), a fraction of said run cyclic speed (6 FPS), a second and smaller fraction of said cyclic speed (2 FPS) and a "still" operation of the projector.

A still further object of the invention includes the provision of a framing means connected to the film transport means mounted for rotation about an axis spaced from the common axis of the activating cams, and providing a conveniently operable arrangement of drive mechanism and framing means for the film transport means.

An additional object of the invention pertains to the provision of a novel multiple element follower for all the speed or drive cams, the elements of which, connected to the film transport means, are shiftable one in a direction normal to the cam axis (for the 18 FPS cam) and another in directions both normal to and parallely to the cam axis (for the 6, 2 and still cams).

To the accomplishment of the foregoing objects, the invention relates particularly to a motion picture projector as defined in the accompanying claims taken together with the following specification and the appended drawings, in which:

BRIEF DESCRIPTION OF THE DRAWINGS

FIG. 4a is a view of a detail of the cam follower action shown in FIG. 4 in a different position than that shown in FIG. 4;

FIG. 9a depicting the position of the same when shifted for the 18 FPS run;

FIG. 9b depicting its position when shifted for the 6 FPS run;

FIG. 9c depicting its position when shifted for 2 FPS; and

FIG. 9d depicting its position when shifted for the still operation of the mechanism.

DESCRIPTION OF THE PREFERRED EMBODIMENT

Figure 1:
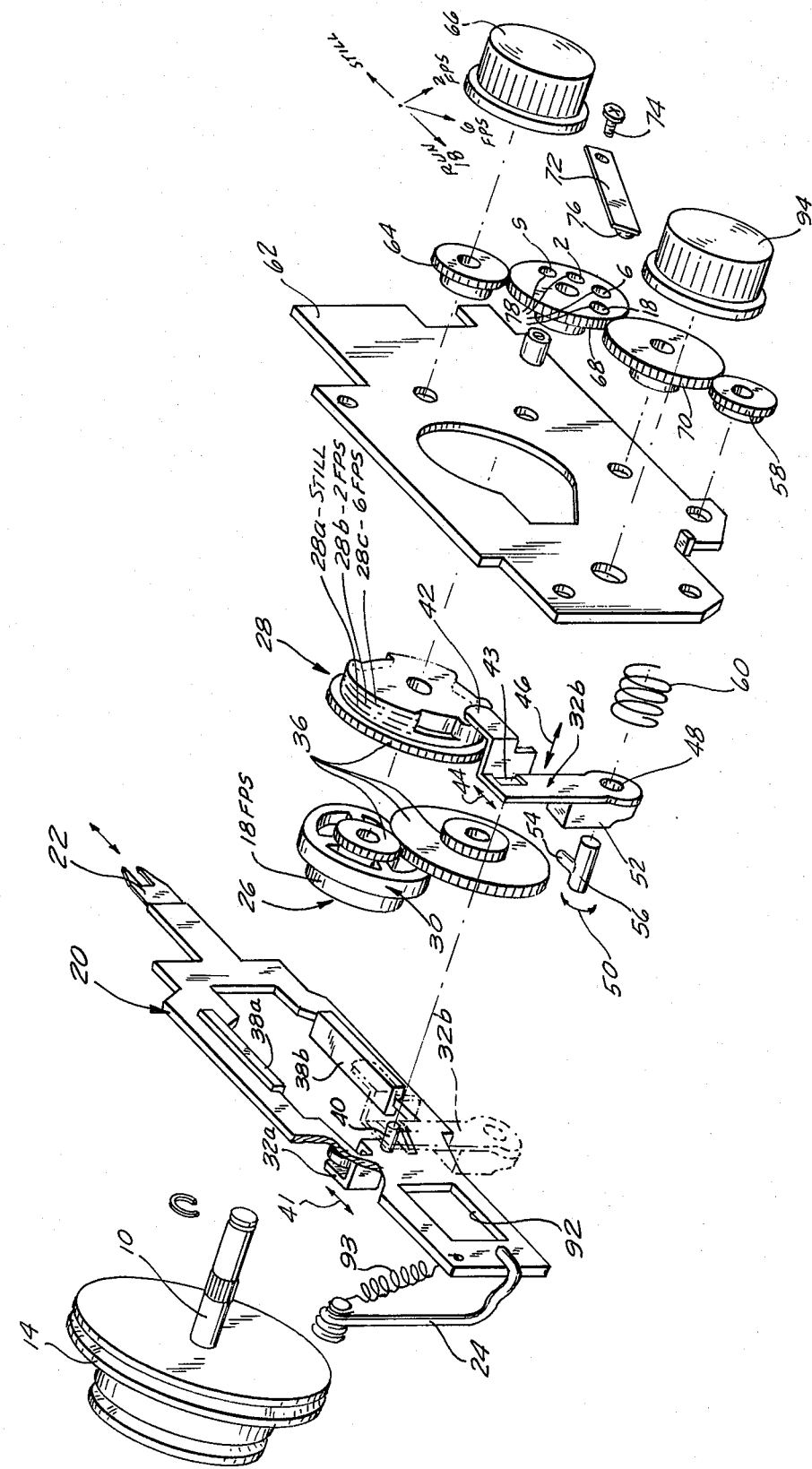
FIG. 1 is a perspective exploded view of all the essential parts of the step motion projection mechanism of the motion picture projector of the invention.
Figure 4:
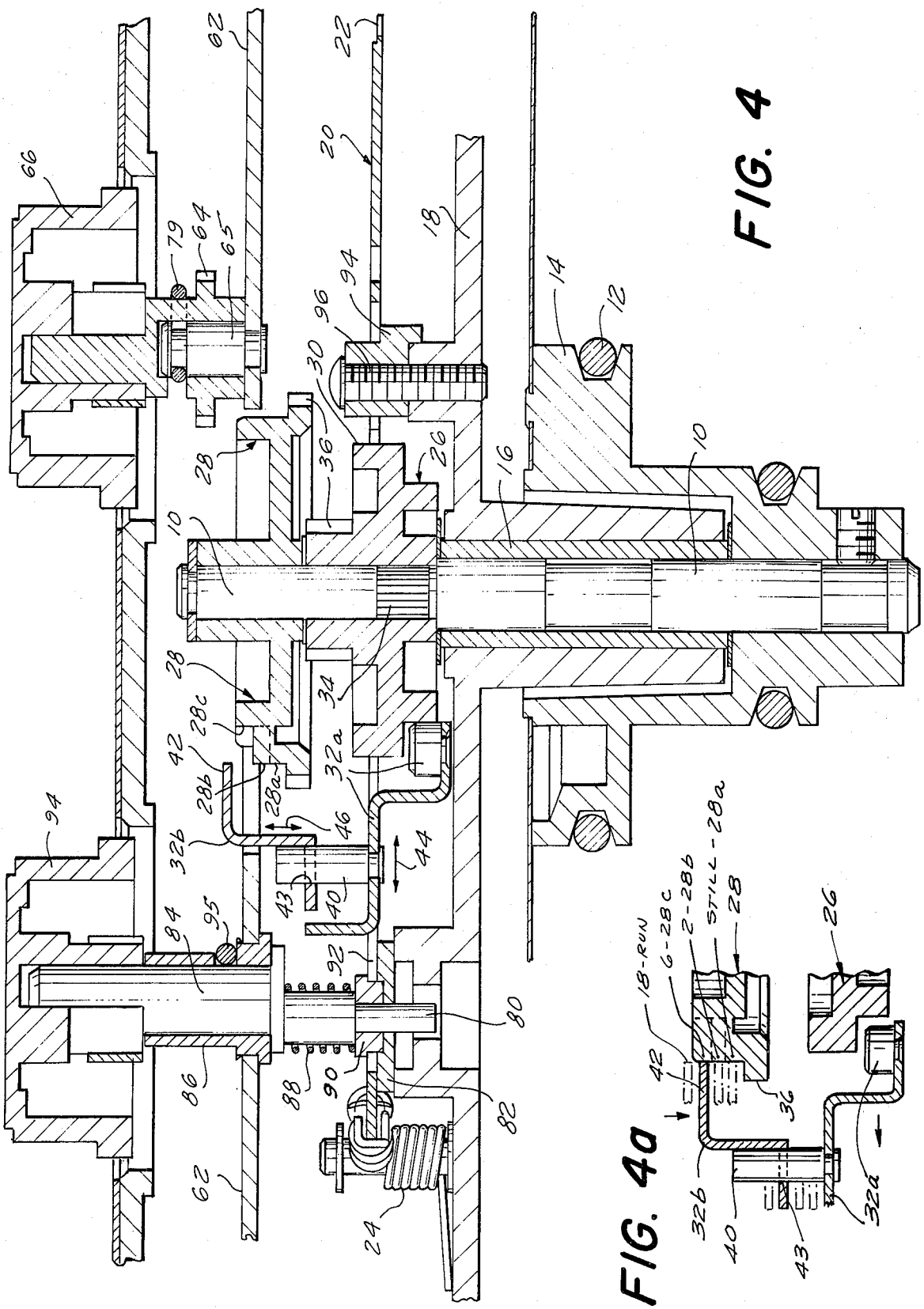
FIG. 4 is a vertical sectional view thereof taken in cross-section along the lines 4—4 of FIG. 2.

Referring now in more detail to the drawings, and having reference first to the exploded view shown in FIG. 1 and to FIG. 4, power is obtained in the projector from a source through a suitable transmission (not shown) and is delivered to a main drive shaft 10 by a suitable belt 12 connected to a compound pulley 14 affixed to the shaft 10 (as best seen in FIG. 4). Shaft 10 rotates in a bearing 16 which is mounted in a main support structure 18 of the projector (FIG. 4).

The projector of the present invention is characterized by the provision of a film transport means 20 having at its front end a claw member 22 for engagement with the perforations of the film (not shown) and which transport means for its film perforation engagement is activated by a torsion spring 24, the force of which is applied to the rear end of the transport means. Mechanism is provided associated with the film transport means for changing the speed of movement of the film driven by said film transport means between (a) a film movement corresponding to a normal run cyclic speed and (b) a film movement which is less than said normal cyclic speed.

Said mechanism comprises a first rotatable in-and-out cam member generally designated as 26 for effecting an in-and-out movement of the transport means for film engagement for a normal run film transport cycle, a second rotatable in-and-out cam member generally designated as 28 active on the transport means for effecting an in-and-out movement of the transport means for film engagement at a speed which is less than said normal run cycle speed, an up-and-down cam 30 operable at said normal run cycle speed active on said transport means for effecting up-and-down movements of said transport means, said in-and-out cam members and said up-and-down cam being mounted for rotation about a common axis, namely, the axis of the drive shaft 10. Associated with these cam members and cam, there is provided a multiple cam follower designated as 32a and 32b both connected to the film transport means 20, said multiple cam follower being shiftable for selective engagement thereof with said in-and-out cam members for changing the speed of movement of the film transport means between said normal run cyclic speed and a speed less than said normal run cyclic speed.

As best seen in FIGS. 1 and 4, the first and second in-and-out cam members 26 and 28 are rotatable at different speeds about the axis of the shaft 10, the first cam member 26 being affixed as at 34 to the shaft 10 and the second cam member 28 being freely rotatable on said shaft 10, transmission reduction gearing combinedly designated as 36 being employed for connecting the first cam member 26 to the second cam member 28. The reduction of this gearing is such that the speed of rotation of the second cam member 28 is reduced to one-ninth of the speed of the first cam member 26. The up-and-down cam member 30 is conveniently united to the first in-and-out cam member 26 whereby they both rotate to produce the normal run (18 FPS) film transport cyclic speed.

The second in-and-out cam member 28 is divided into zones for producing two different fractions of a run cyclic speed and also for producing a still operation of the film transport means. The three different zones of this cam member comprises a zone 28a acting as the still cam, a next zone 28b for producing a low fraction of the normal speed (2 FPS) and a third zone 28c for producing an intermediate fraction of the normal speed (6 FPS). For this purpose the zone 28c is formed with three depressions for cam follower engagement, the zone 28b is formed with one depression (coincident with a depression in the zone 28c) and the zone 28a provides a continuously smooth zone.

Figure 6:
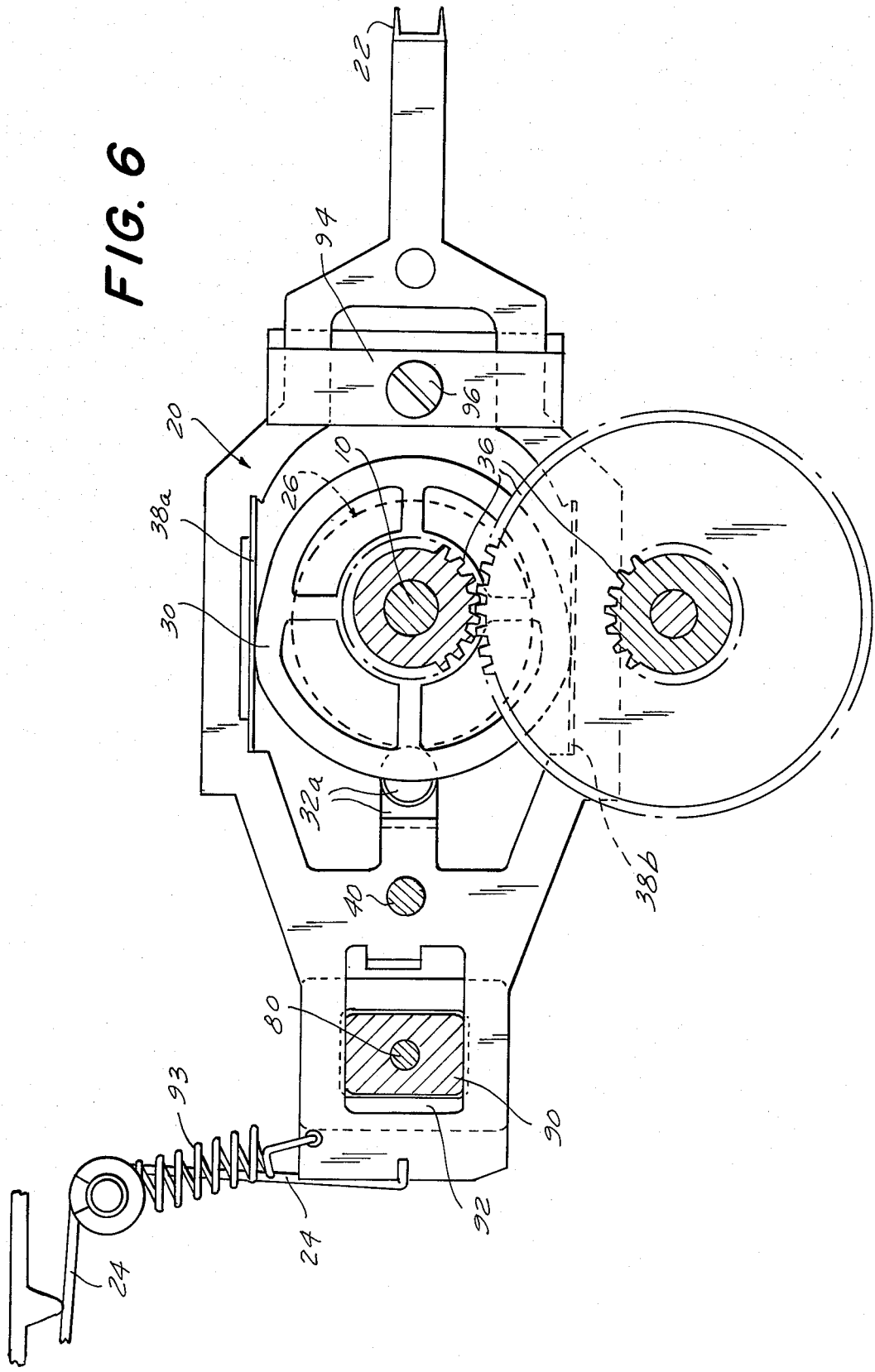
FIG. 6 is a horizontal cross-sectional view of the mechanism taken in cross-section along the broken lines 6—6 of FIG. 5.

The transport means 20 is formed with upper and lower follower elements 38a and 38b cooperating with the up-and-down cam 30, the association of these parts thereby imparting action to the transport means 20 at the normal run cyclic speed (see particularly FIG. 6 for association of the cam follower elements and the up-and-down cam).

The multiple cam followers for the in-and-out cams comprises the cam follower element 32a fixedly connected to (and forming part of) the transport means 20 which cooperates with the first cam member 26 (for normal run operation), and the second cam follower element 32b connected to the film transport means 20 by being slidable on a pin 40 integral with the transport means 20. The cam follower elements 32a is shiftable with reference to the cam 26 in a direction as indicated by the double arrow 41 normal to the axis of the drive shaft 10, but the cam follower element 32b in addition to its being shiftable with reference to the cam member 28 in a direction indicated by the double arrow 44 normal to the common axis of the cams is also shiftable as indicated by double arrow 46 in a direction parallel to said normal axis of the cams.

To effect the selective shifting of these cam follower elements (for all of the in-and-out cams), the cam follower element 32b, besides being slidably movable on the pin 40 is movable so that its cam engaging end 42 is movable in the direction of the arrow 46 for selective engagement with any of the three zones 28a, 28b and 28c of the second cam member 28. To effectuate this, the cam follower element 32b comprises a lever 48 and movable rotatably in the directions of the double arrow 50 by means of a cam 52 fixed to 32b, the cam being actuated by a pin 54 forming part of a stub shaft 56 which is fixed to a gear 58, a compression spring 60 being active in conjunction with said cam to effect the in-and-out (axially) movements of said cam follower lever 32b.

For actuating the multiple cam follower elements 32a and 32b, there is provided a gear train which includes the said gear 58 and which consists of gears all mounted for rotation on the frame piece 62 and comprising a pinion 64 fixed to a shaft 65 of a change speed knob 66, a meshing gear 68 and a gear 70 intermeshing with the gear 68 and the gear or pinion 58. The knob 66 is rotatable into a number of positions (here shown four in number), the said knob being selectively movable into the four positions indicated in FIG. 1 (18 FPS, 6 FPS, 2 FPS and still operation) for shifting the cam elements 32a and 32b. A spring detent 72 also affixed to the frame part 62 by means of the screw 74 is provided, said detent having a part 76 for selective lodgement in apertures 78 formed in the gear 68 for fixedly holding the gear system and the cam elements operated thereby in the four positions referred to. A slidably removable cotter pin 79 (see FIGS. 2 and 4) is used to engage and hold the gear 64 in position.

Figure 7:
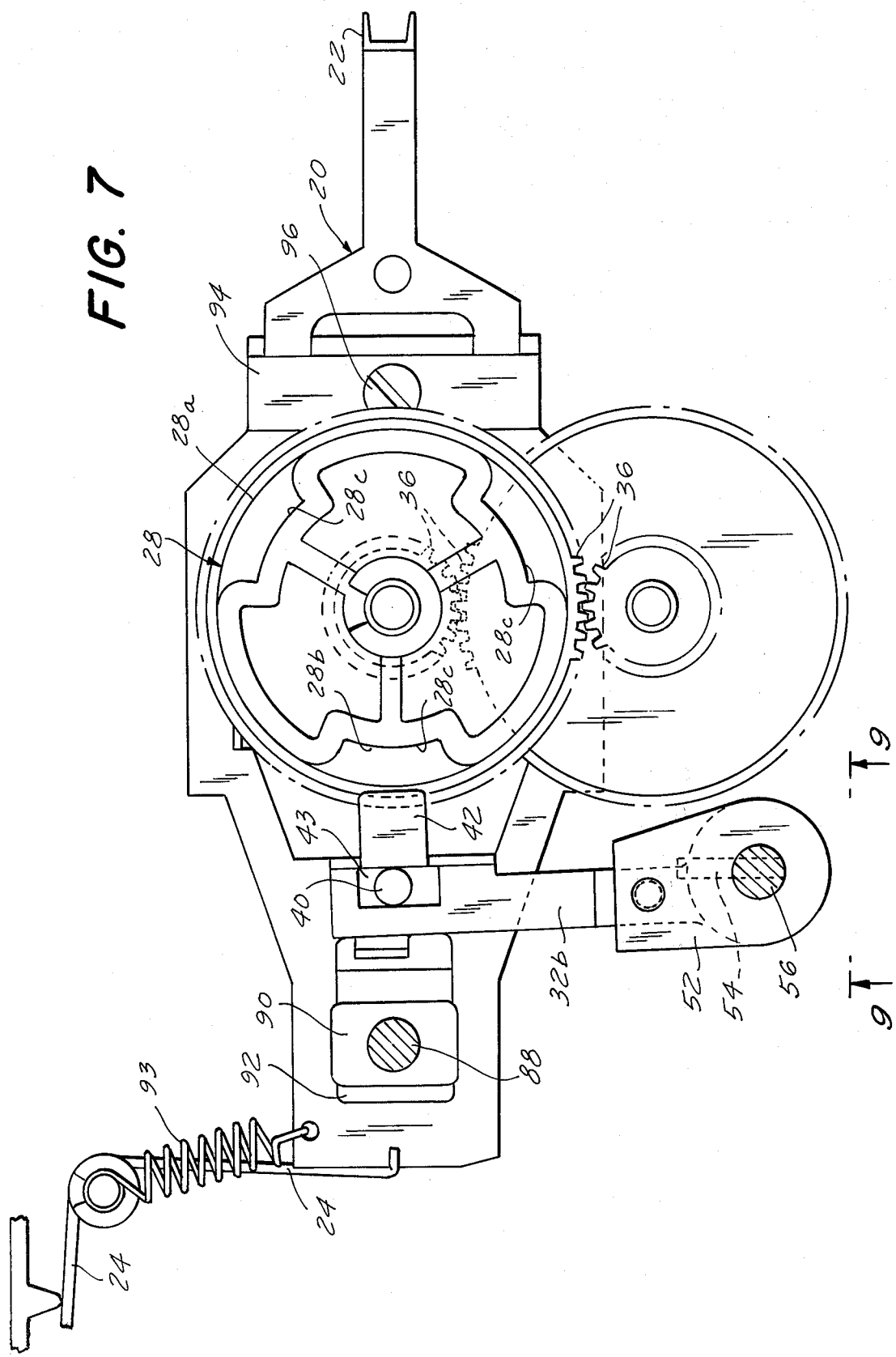
FIG. 7 is a similar horizontal cross-sectional view taken in cross-section along the lines 7—7 of FIG. 5.

For mounting the transport means 20 for its translatory (in-and-out and up-and-down) movements, there is provided a stud member 80 (see FIGS. 4 and 6) mounted in a retainer member 82 (FIG. 4), which latter comprises a positional bearing so that the stud serves as a pivot about which the film transport 20 oscillates and as a confining element such that slidable in-and-out motion of the film transport is permitted. Stud member 80 is eccentrically fixed to a control shaft 84 which latter is rotatably mounted in a bearing 86 held in the support frame plate 62. A spring 88 located around the upper extension of the stud 80 applies pressure against the retainer 82 through a framing part 90 described further hereinbelow. The transport means 20 is provided with an opening 92 to permit the same to move translationally about the pivot stud 80. To assist in the translatory motion of the transport means, there is also preferably provided a spring 93 acting on the rear end of the transport means as best seen in FIGS. 1 and 7.

Cooperating with the pivotal means for the transport means 20, there is provided toward the front end of the transport means a guide member 94 affixed to the frame part 18 by means of a screw 96 (see FIGS. 4 and 6). Said guide member acts as a confining element for the transport means to permit its slidable translational movements.

Figure 5:
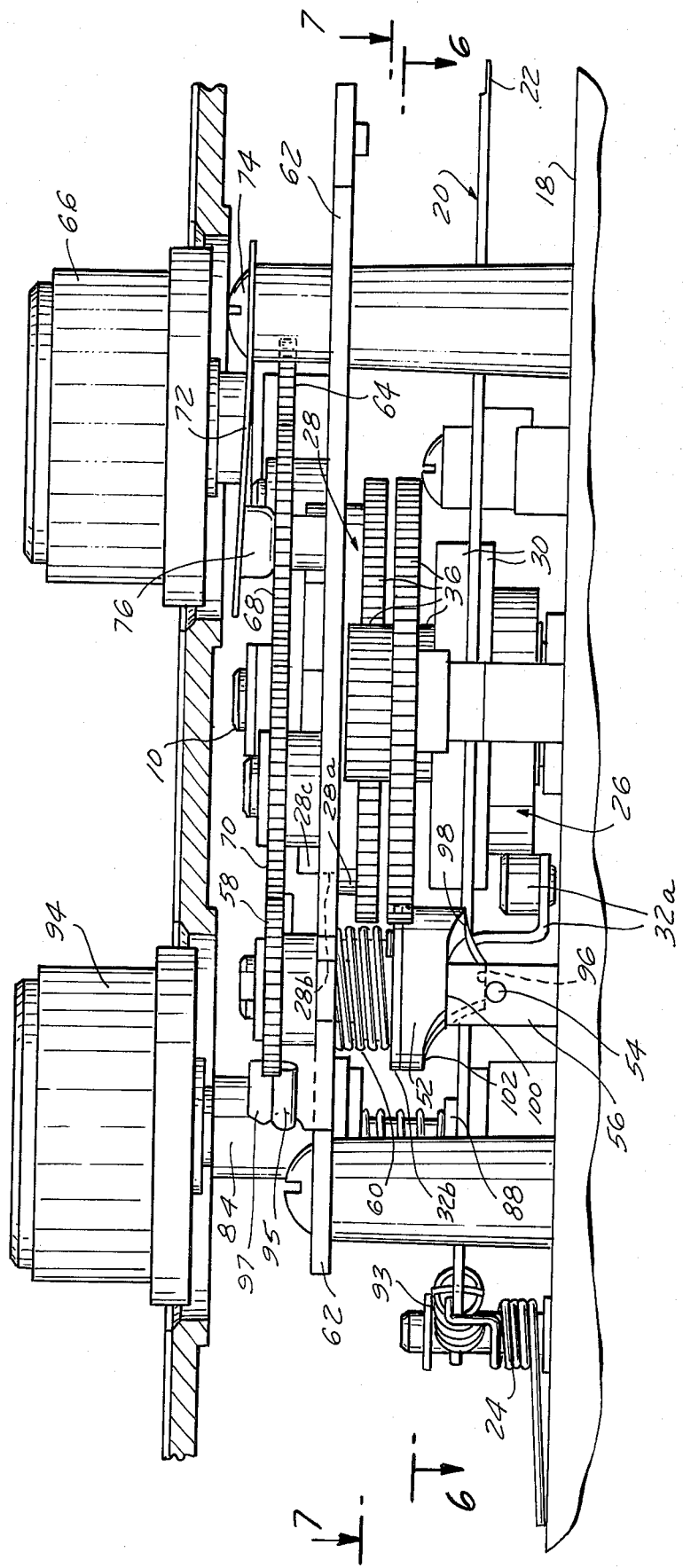
FIG. 5 is a front vertical elevational view of the said mechanism.

Means is provided for framing the film in the projector. The opening 92 in the transport means is made rectangular in shape (see particularly FIGS. 6 and 7) and the framing part 90 (above referred to) is also made rectangular in shape, the latter having a portion which fits into opening 92 in a transverse direction as best indicated in FIGS. 6 and 7, the framing part 90 permitting however of the translational movement of the transport means. The framing part 90 is as above indicated eccentrically mounted in the shaft 84 to which shaft is attached a framing knob 94 (FIGS. 4 and 5). Rotation of the knob and the shaft changes the angular position of the framing part 90 having the effect of shifting the fulcrum about which the film transport means oscillates and translates, thus changing the points of penetration of the film perforations of the claw 22 of the film transport means thereby framing the film in the projector. This action also shifts the pivotal position of the stud 80 (which is unitary with the frame part 90). A torsion spring 95 (see FIGS. 2 and 4) anchored at 97 to the frame support 62 acts on the framing shaft 84 to frictionally engage the same and hold the same against undesired rotation.

Figure 8:
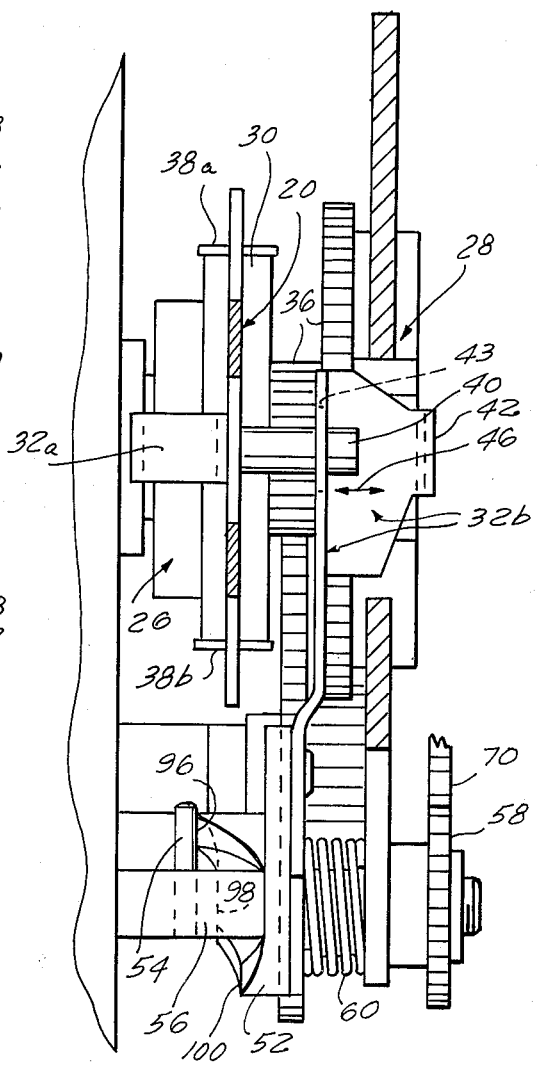
FIG. 8 is a sectional view taken in cross-section along the lines 8—8 of FIG. 2.
Figure 9A:
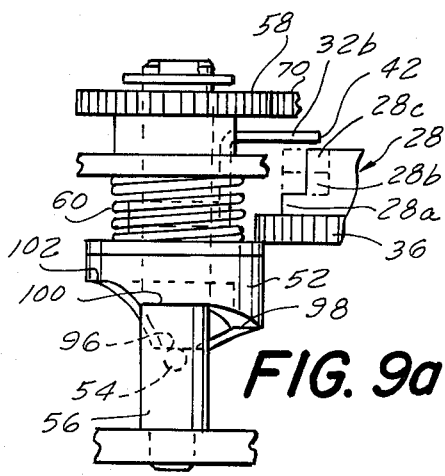
FIGS. 9a–9d are views showing the operation of one of the cam followers for the multiple drive cams, encompassed within the area 9—9 of FIG. 7.
Figure 9B:
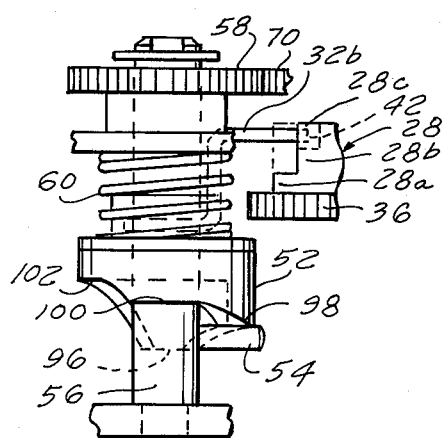
Figures 9C, 9D:
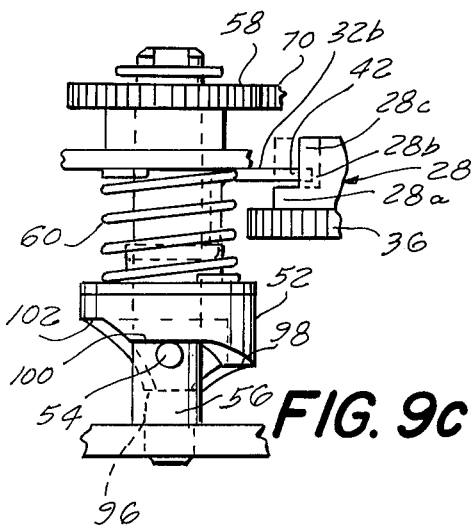

The mechanism effecting the shifting of the cam followers is shown in FIG. 8 and FIGS. 9a, 9b, 9c and 9d of the drawings. FIG. 8 shows the relation between the cam followers 32a and 32b. FIG. 9a depicts the operation of the positioning cam 52 for a run (18 FPS) operation, FIG. 9b shows the operation of the same for the intermediate (6 FPS) film speed, FIG. 9c shows the operation of the same at the low (2 FPS) speed, and FIG. 9d shows the operation of the same for the "still" operation.

As shown in FIG. 8, the followers element 32a is fixed to the cam follower 20 and is in engagement with the cam 26, and the follower 32b is movably connected to the pin or stud 40 unitary with the transport means 20, the movement of the cam follower 32b on this stud being in the direction of the double arrow 46, this cam follower being formed with an aperture 43 received by the pin or stud 40 (see also FIG. 1).

The positioning cam 52 is formed with four landing areas (for the stop engagement with the pin 54), said landing areas being designated as 96, 98, 100 and 102. When the cam 52 is moved into the position shown in FIG. 9a, the pin 54 is at the cam landing area 96, the cam 52 having been lifted to the position shown in FIG. 9a, such that the cam follower end 42 surmounts the cam member 28 (to permit the 18 FPS operation). When the cam 52 is moved to the position shown in FIG. 9b where the pin 54 is at the landing area 98, the cam 52 has been dropped by the spring 60 to the position shown in FIG. 9b at which the cam follower 32b is in engagement with the cam 28c (for effecting the 6 FPS operation). When the cam 52 is moved to the position shown in FIG. 9c where the pin 54 is at the landing area 100, the cam has been further dropped by the action of the spring 60 to the indicated position at which the cam follower 42 is now in engagement with the cam 28a for producing the 2 FPS cycle operation. When the cam 52 is moved to the position as shown in FIG. 9d, the pin 54 is in engagement with the landing area 102 of the cam, the cam having been further dropped by the spring 60 to the position as shown in this FIG., in which the cam follower 42 is moved to engage the cam 28a for effecting the still operation of the machine.

The various Figs. of the drawings depict the various positional parts of the machine, these Figs. also show the mounting of the various already described parts on the frame parts of the machine, it being understood that these different Figs. as described in the brief description of the Figs. omit certain parts of the machine for purposes of clarity.

The exploded view shown in FIG. 1 depicts the position of all of the parts for the run (18 FPS) position. In this position the follower end 42 of the follower element 32b surmounts all of the cam parts of the cam 28 to permit the cooperative engagement of the follower element 32a with the cam 26.

Figure 2:
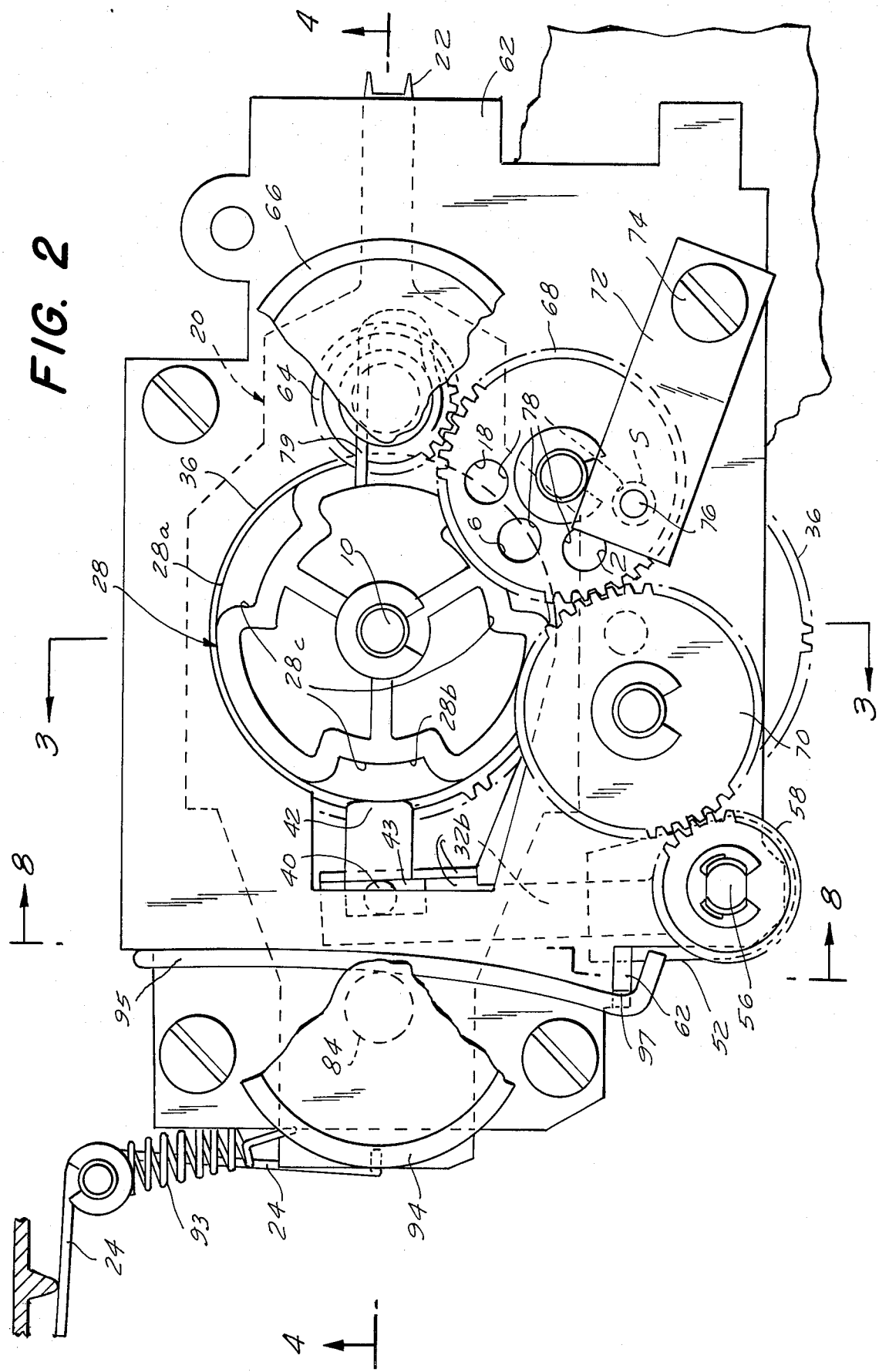
FIG. 2 is a top plan thereof.

FIG. 2 depicts the parts of the machine during a still projection. In this Fig. the follower end 42 is in engagement with the still cam 28a.

Figure 3:
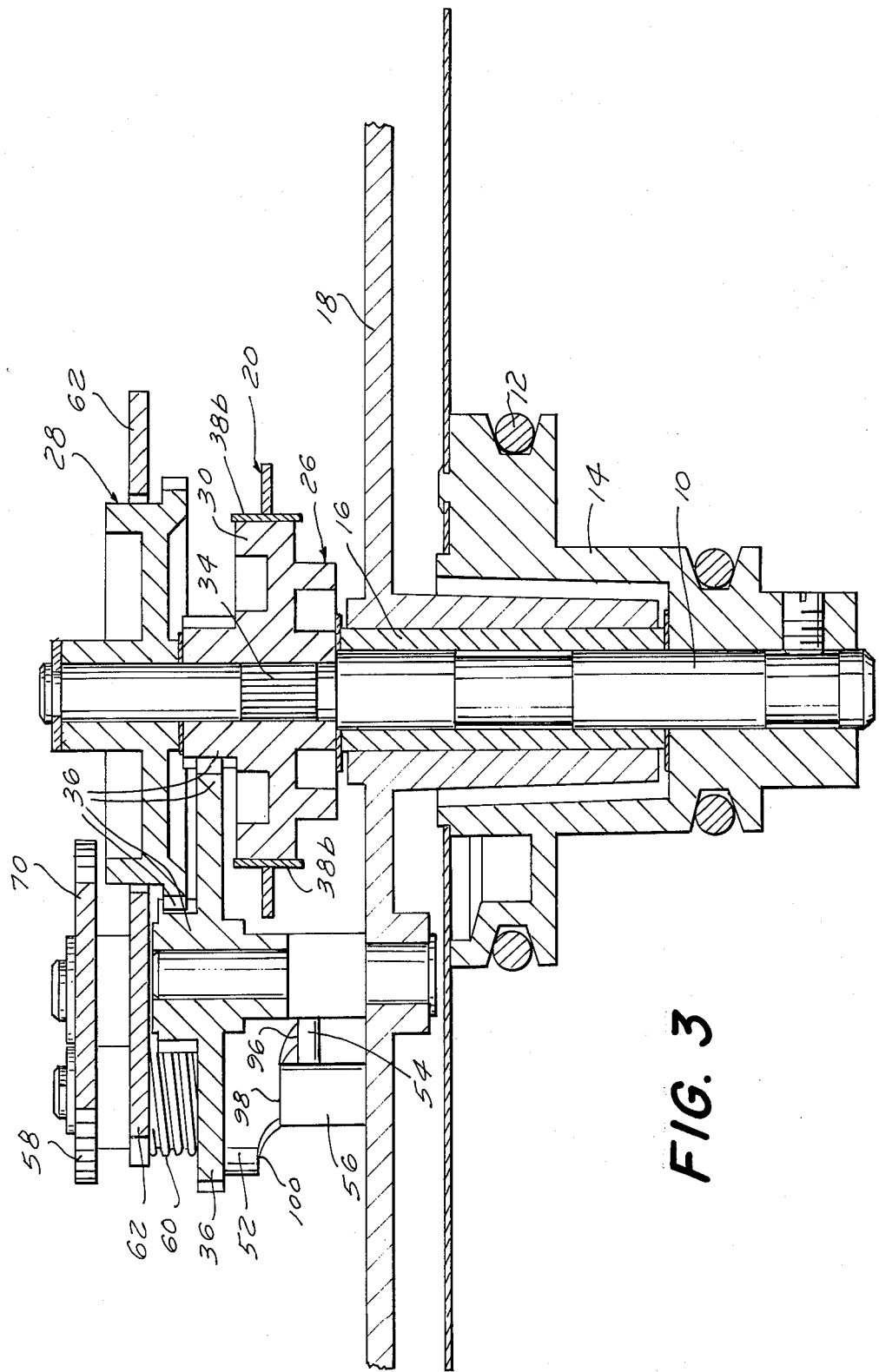
FIG. 3 is a vertical sectional view thereof taken in cross-section along the lines 3—3 of FIG. 2.

FIG. 3 depicts the assumed position of the part of the machine in the run (18 FPS) position, the cam 52 having been moved to its uppermost position by the lifting action of the pin 54.

FIG. 5 depicts the position of the machine parts in the run (18 FPS) position. The cam follower 42 here is shown in the position surmounting (and thereby being free of) the cams of the cam member 28 while the cam follower 32a is now shown in operative engagement with the cam 26. FIG. 4a shows these parts in the next positional phase, the cam follower 32b having been moved so that its cam follower end 42 is now in cooperative engagement with the cam 28c (for the 6 FPS cycle), the cam follower 32a having been moved to a position out of engagement with the cam 26.

FIG. 5 depicts the assumed position of the parts of the machine corresponding to the FIG. 9a position wherein the cam follower 32a is in operative engagement with the cam 26 for effecting the run (18 FPS) operation.

Both FIGS. 6 and 7 depict the position of the parts of the machine in the run or 18 FPS position, and as described in the brief description of the Figs., FIG. 6 is a view taken in cross section along the broken line 6—6 of FIG. 5 while FIG. 7 is a view taken in cross section along the lin 7—7 of FIG. 5. As shown in FIG. 7, the pin or stud 54 is in a position corresponding to that assumed in FIG. 9a of the drawings wherein the cam follower end 42 surmounts the cam follower 28 to permit the 18 FPS operation.

The operation of the machine will be readily understood from both the description and the various phases of the operation described above. It would be also understood that many changes may be made in the details of the described structure without changing the essence or spirit of the invention defined in the following claims.

I claim:

1. In a motion picture projector, a film transport means intermittently operable at a normal run film transport cyclic speed, mechanism for changing the speed of movement of the film driven by said film transport means between (a) a film movement corresponding to said normal run cyclic speed and (b) a film movement which is less than said normal cyclic speed, said mechanism comprising a first rotatable in-and-out cam member active on said transport means for effecting an in-and-out movement of the transport means for film engagement for the normal run film transport cycle, a second separately rotatable in-and-out cam member active on the transport means for effecting an in-and-out movement of the transport means for film engagement at a speed which is less than said normal run cyclic speed, an up-and-down cam operable at said normal run cyclic speed active on said transport means for effecting up-and-down movements of said transport means, said first and second in-and-out cam members and said up-and-down cam being mounted for rotation about a common axis, a cam follower connected to said film transport means, and mechanism for shifting the said cam follower for selective engagement thereof with said in-and-out cam members for changing the speed of movement of the film transport means between said normal run cyclic speed and a speed less than said normal run cyclic speed.

2. The motion picture projector of claim 1, in which the first and second in-and-out cam members are rotatable at different speeds, and speed reduction gearing is provided connecting the said first and second in-and-out cam members.

3. The motion picture projector of claim 2, in which the first in-and-out cam member is rotatable at said normal run cyclic speed, and said second in-and-out cam member is rotatable at a speed which is a fraction of said normal cyclic speed.

4. The motion picture projector of claim 2, in which the second in-and-out cam member comprises three axially spaced cams, one for effecting film engagement at one fraction of the run cyclic speed, another for effecting film engagement at a second and different fraction of the run cyclic speed and a third for preventing film engagement of the transport means to produce a "still" operation.

5. The motion picture projector of claim 1, in which the cam follower comprises two elements, both mounted on the film transport means, one shiftable for engagement with the first in-and-out cam member and the other shiftable for engagement with the second in-and-out cam member.

6. The motion picture projector of claim 1, in which the second in-and-out cam member comprises two axially spaced cams, one for effecting film engagement at a fraction of the run cyclic speed, and the other for preventing film engagement of the transport means to produce a "still" operation.

7. The motion picture projector of claim 6, in which the cam follower comprises two elements, both connected to the film transport means, one shiftable for engagement with the first in-and-out cam member and the other variably shiftable into engagement with said spaced cams of said second in-and-out cam member or selectively effecting either the fraction of the run cyclic speed or the "still" operation.

8. The motion picture projector of claim 1, in which the second in-and-out cam member comprises three axially spaced cams, one for effecting film engagement at one fraction of the run cyclic speed, another for effecting film engagement at a second and different fraction of the run cyclic speed and a third for preventing film engagement of the transport means to produce a "still" operation.

9. The motion picture projector of claim 8 in which the cam follower comprises two elements, both connected to the film transport means, one shiftable for engagement with the first in-and-out cam member and the other variably shiftable into engagement with the three axially spaced cams on the second in-and-out cam member for selectively effecting film engagement at one fraction of the run cyclic speed, or at a second and different fraction of the run cyclic speed, or for effecting the "still" operation.

10. The motion picture projector of claim 1, in which the first in-and-out cam member is united to the up-and-down cam.

11. The motion picture projector of claim 1, in which the cam follower comprises two elements, both connected to the film transport means, one shiftable in a direction normal to said common axis and the other shiftable in directions both normal to and parallel to said common axis for selective engagement with said in-and-out cam members.

12. The motion picture projector of claim 11, in which the first mentioned cam follower is shiftable for engagement with said first rotatable in-and-out cam member, and the other mentioned cam follower is shiftable for engagement with said second rotatable in-and-out cam member.

13. The motion picture projector of claim 12, in which the first mentioned cam follower is shiftable for engagement with said first rotatable in-and-out cam member, and the other mentioned cam follower is shiftable for selective engagement with different cams on said second in-and-out cam member.

* * * * *